(12) United States Patent
Mou et al.

(10) Patent No.: US 11,536,224 B2
(45) Date of Patent: Dec. 27, 2022

(54) POWER DRIVER OF UNMANNED AERIAL VEHICLE

(71) Applicant: Microjet Technology Co., Ltd., Hsinchu (TW)

(72) Inventors: Hao-Jan Mou, Hsinchu (TW); Chi-Feng Huang, Hsinchu (TW); Yung-Lung Han, Hsinchu (TW); Hsuan-Kai Chen, Hsinchu (TW); Chun-Yi Kuo, Hsinchu (TW); Chih-Kai Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 623 days.

(21) Appl. No.: 16/704,347

(22) Filed: Dec. 5, 2019

(65) Prior Publication Data
US 2020/0191094 A1    Jun. 18, 2020

(30) Foreign Application Priority Data

Dec. 13, 2018    (TW) .................................. 107145092

(51) Int. Cl.
*F04B 17/00*    (2006.01)
*F04B 43/04*    (2006.01)
(Continued)

(52) U.S. Cl.
CPC .............. *F02K 7/08* (2013.01); *B64C 39/024* (2013.01); *B64D 27/16* (2013.01); *B64D 27/24* (2013.01);
(Continued)

(58) Field of Classification Search
CPC .......... B64C 2201/16; B64C 2201/167; B64C 29/0016; B64C 21/04; B64C 2230/02; B64C 2230/04; B64C 2230/18; B64D 27/02; F15D 1/008; F15D 1/0095
See application file for complete search history.

(56) References Cited

U.S. PATENT DOCUMENTS

| 6,056,237 A * | 5/2000 | Woodland ............. B64C 39/024 244/49 |
| 6,857,601 B2 * | 2/2005 | Akahori ............... G08G 5/0052 244/30 |

(Continued)

FOREIGN PATENT DOCUMENTS

CN    102107736 B    6/2016

*Primary Examiner* — Kenneth J Hansen
*Assistant Examiner* — Benjamin Doyle
(74) *Attorney, Agent, or Firm* — Birch, Stewart, Kolasch & Birch, LLP

(57) ABSTRACT

A power driver of an unmanned aerial vehicle is disclosed and includes a main body, a fluid actuation system and a controller, wherein the fluid actuation system includes a driving zone, a converging chamber, a plurality of valves and a fluid discharging zone. The driving zone includes a plurality of flow guiding units which arranged in series, parallel or series-parallel, each of the flow guiding unit generates an inside pressure gradient after being actuated, so as to inhale fluid and diverge fluid by guiding channels, and flow into the convergence chamber for storage, wherein the amount of the fluid transported is controlled by the plurality of valves disposed in the connection channels through the controller, and fluid is finally converged to the fluid discharging zone for discharging the specific transportation amount of fluid.

11 Claims, 16 Drawing Sheets

(51) Int. Cl.
*F04B 43/073* (2006.01)
*F02K 7/08* (2006.01)
*B64C 39/02* (2006.01)
*B64D 27/24* (2006.01)
*B64D 27/16* (2006.01)

(52) U.S. Cl.
CPC .......... *F04B 17/003* (2013.01); *F04B 43/046* (2013.01); *B64C 2201/027* (2013.01); *B64C 2201/042* (2013.01); *B64C 2201/146* (2013.01); *B64C 2201/167* (2013.01); *F04B 43/073* (2013.01); *F04B 43/0736* (2013.01)

(56) References Cited

U.S. PATENT DOCUMENTS

| | | | | |
|---|---|---|---|---|
| 10,207,812 | B2* | 2/2019 | Evulet | B64C 21/00 |
| 10,358,230 | B2* | 7/2019 | Sahu | B64C 39/024 |
| 2013/0062457 | A1* | 3/2013 | Deakin | H01Q 9/27 |
| | | | | 343/706 |
| 2014/0328666 | A1* | 11/2014 | Christopher | F03D 3/04 |
| | | | | 415/1 |
| 2016/0304200 | A1* | 10/2016 | Lopez-Poy | A01M 13/00 |
| 2017/0341769 | A1* | 11/2017 | Haberbusch | F17C 5/007 |
| 2019/0127065 | A1* | 5/2019 | Capunay | B64C 29/0075 |
| 2019/0135426 | A1* | 5/2019 | Bailie | B64C 29/0033 |
| 2019/0300157 | A1* | 10/2019 | O'Brien | F04D 25/08 |
| 2020/0283142 | A1* | 9/2020 | Canli | B64C 3/16 |
| 2020/0298961 | A1* | 9/2020 | Bernhardt | F04D 15/00 |
| 2021/0053672 | A1* | 2/2021 | Villabrille Prades | B64D 27/24 |
| 2021/0138281 | A1* | 5/2021 | Nohmi | B64F 3/02 |
| 2021/0229805 | A1* | 7/2021 | Getman | B64C 27/52 |
| 2021/0229823 | A1* | 7/2021 | Peloquin | B64D 27/02 |
| 2021/0302955 | A1* | 9/2021 | Ponda | G08G 5/0013 |
| 2022/0017220 | A1* | 1/2022 | Bae | A47L 9/122 |
| 2022/0194583 | A1* | 6/2022 | Zima | B64B 1/40 |
| 2022/0242562 | A1* | 8/2022 | Perlo | H02K 21/24 |

* cited by examiner

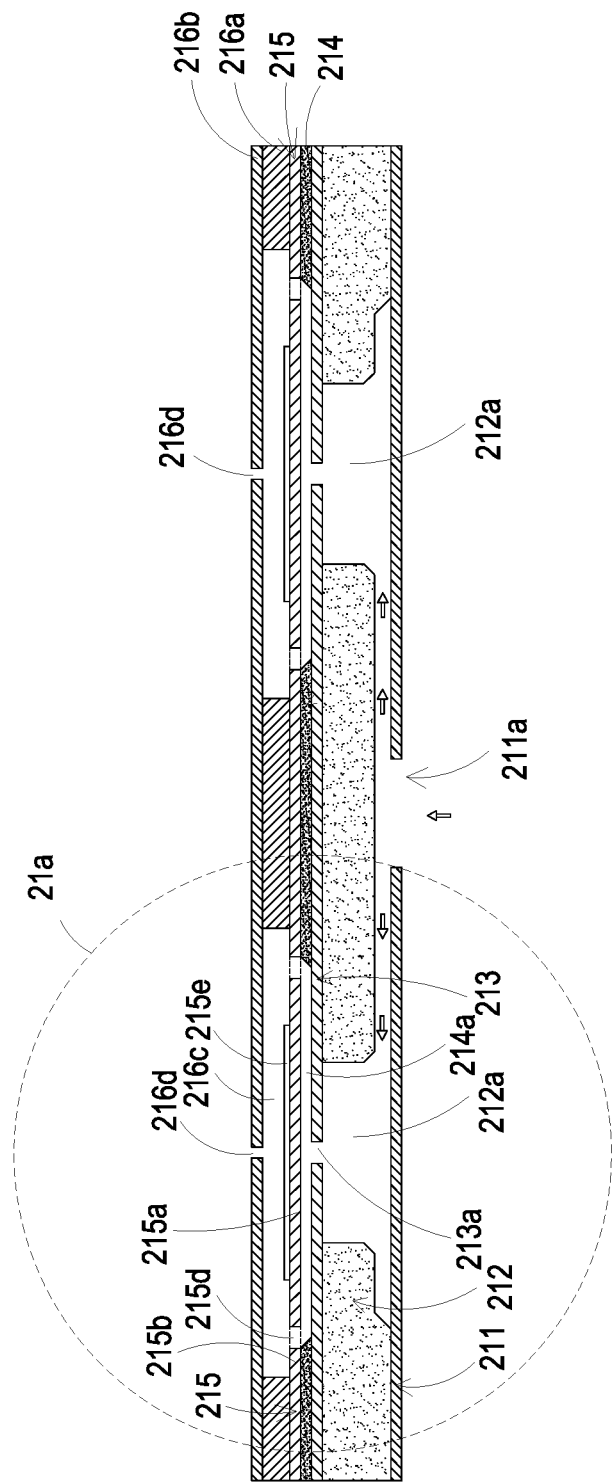

POWER DRIVER OF UNMANNED AERIAL VEHICLE

FIELD OF THE INVENTION

The present disclosure relates to a power driver of an unmanned aerial vehicle, and more particularly to a power driver of an unmanned aerial vehicle, which is capable of converting electric energy into kinetic energy and utilizing the kinetic energy to generate a specific gas pressure and gas flow rate, and has a corresponding appearance body manufactured and designed according to different requirements.

BACKGROUND OF THE INVENTION

Nowadays, in various fields such as pharmaceutical industries, computer techniques, printing industries or energy industries, the products are developed toward elaboration and miniaturization. The fluid transportation devices are important components that are used in, for example micro pumps, micro atomizers, print heads or industrial printers. Therefore, how to utilize an innovative structure to break through the bottleneck of the prior art has become an important part of development.

For example, in the pharmaceutical industry, there are many instruments or equipment that require pneumatic power to drive them. Usually, traditional motors and pneumatic valves are used to achieve the purpose of gas transportation. However, due to the volume limitation of these traditional motors and pneumatic valves, it is difficult to reduce the entire size of such instruments and equipment. Namely, it is difficult to achieve the purpose of thinning, and it is impossible to make them portable.

In addition to the aforementioned pharmaceutical industry, driving devices, such as conventional motors, compressors, engines and so on are usually utilized in other electronics, printing, energy, or even traditional industries. However, in order to achieve the required kinetic energy, these conventional driving devices usually need to have a huge volume to accommodate all kinds of complicated driving cores. Moreover, when the conventional driving devices are operated, huge noise or flying dust and other pollution are generated. Consequently, a lot of inconvenience and discomfort are caused in use.

Therefore, it is necessary to provide a power driver of an unmanned aerial vehicle to solve the problems of huge volume and huge noise caused by the traditional driving devices, such as traditional motors, compressors, engines and so on.

SUMMARY OF THE INVENTION

An object of the present disclosure is to provide a power driver of an unmanned aerial vehicle. A fluid actuation system is disposed within a main body of a power actuator. A driving zone of the fluid actuation system is formed by one or more flow guiding units arranged in a series, parallel or series-parallel arrangement. Each flow guiding unit is enabled to generate a pressure gradient inside itself, so that fluid is inhaled, flows through a flow guiding channel, and is accumulated in a convergence chamber for storage. When the fluid required is outputted, the transporting amount is increased. The transporting amount of the fluid outputted through the flow guiding channel is controlled by a plurality of valves, and the fluid is converged in a fluid discharging zone for outputting the transporting amount according to the requirement. It is achieved to convert the electric energy into the kinetic energy. Furthermore, the transporting amount, the flow rate and the pressure of the fluid outputted by the fluid actuation system are controlled and adjusted. Thus, the driving method of the flow guiding unit and the number and arrangement of the flow guiding channels are adjusted flexibly, and it is beneficial to meet the needs of controlling various transporting amount and achieve the gas transportation in high transporting amount, high efficiency and high flexibility. When the power driver is applied to the unmanned aerial vehicle, a sufficient driving force is provided for flight.

In accordance with an aspect of the present disclosure, a power driver of an unmanned aerial vehicle is disclosed. The power driver of the unmanned aerial vehicle converts electric energy into kinetic energy, and the kinetic energy is utilized to generate a specific gas pressure and gas flow rate. The power driver of the unmanned aerial vehicle includes at least one main body, at least one fluid actuation system, and a controller. The at least one fluid actuation system is disposed within the main body and includes a driving zone, a plurality of flow guiding channels, a convergence chamber, a plurality of valves and a fluid discharging zone. The driving zone includes a plurality of flow guiding units. Each flow guiding unit includes an outlet aperture, and when the flow guiding unit is actuated, fluid is transported and discharged through the flow guiding unit. The plurality of flow guiding channels includes a plurality of diverge channels. Each of the diverge channels is in fluid communication with a plurality of connection channels to flow a required amount of the fluid and the fluid is converged and outputted through each of the plurality of connection channels. The convergence chamber is in fluid communication between each two of the diverge channels to allow the fluid to be accumulated therein, so that when the fluid required is outputted, a transporting amount of the fluid transported through the plurality of the diverge channels is increased. Each of the plurality of valves is disposed in the corresponding connection channel and controlled in an open/closed state for the corresponding connection channel. The fluid discharging zone is connected with the plurality of the connection channels to converge and output the fluid in the required amount. The controller is connected to the plurality of valves to control the valves in the open/closed state, so that the plurality of connection channels are controlled and the fluid transported through the plurality of connection channels are converged into the fluid discharging zone and outputted in the required amount for providing the power driver with a driving force to fly.

The above contents of the present disclosure will become more readily apparent to those ordinarily skilled in the art after reviewing the following detailed description and accompanying drawings, in which:

BRIEF DESCRIPTION OF THE DRAWINGS

FIG. 4B schematically illustrates a portion of the driving zone of the fluid actuation system, in which the flow guiding units are connected with each other in a serial arrangement.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
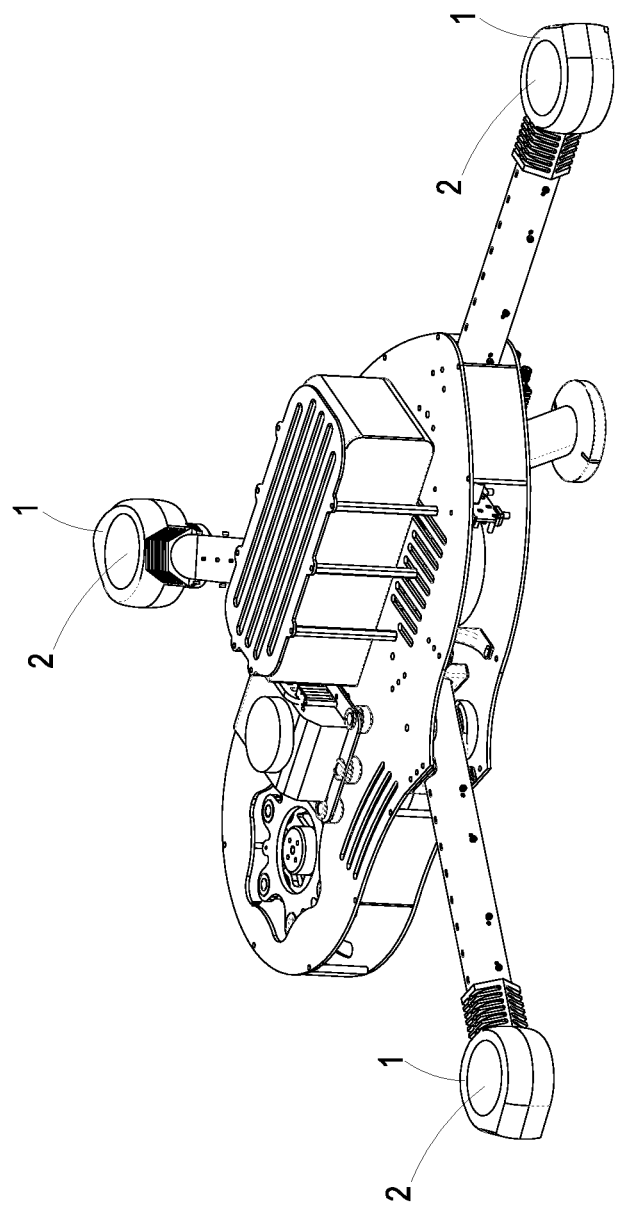
FIG. 1 schematically illustrates a power driver of an unmanned aerial vehicle according to an embodiment of the present disclosure.
Figure 2:
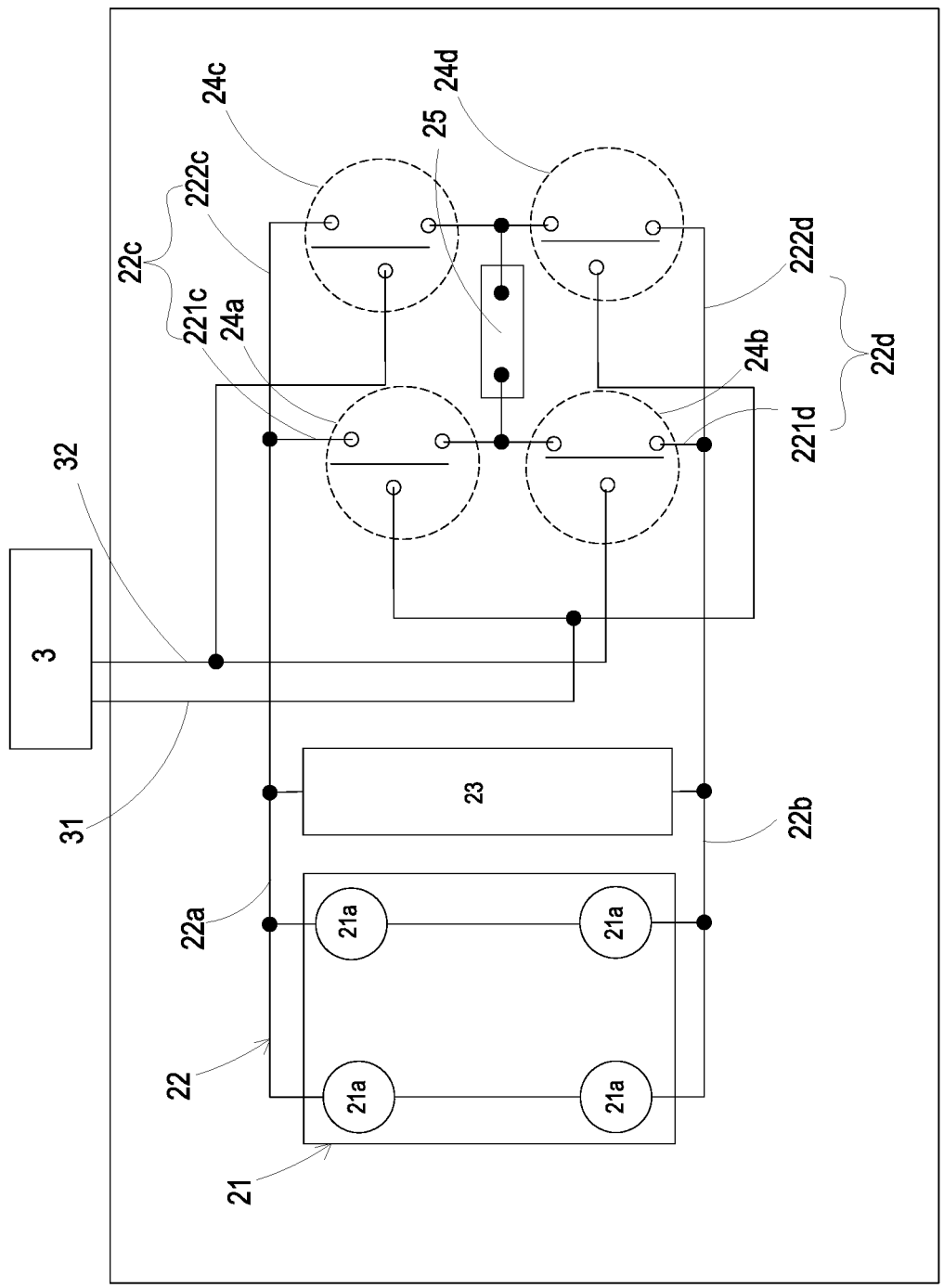
FIG. 2 is a block diagram illustrating a fluid actuation system and a controller of the power driver according to the embodiment of the present disclosure.

Please refer to FIGS. 1 and 2. The present discourse provides a power driver of an unmanned aerial vehicle, which converts electric energy into kinetic energy, and utilizes the kinetic energy to generate a specific gas pressure and gas flow rate. In the embedment, the power driver of the unmanned aerial vehicle includes at least one main body 1, at least one fluid actuation system 2 and a controller 3. In FIG. 1, the numbers of the main body 1 and the fluid actuation system 2 are exemplified by three for each in the following embodiments but not limited thereto. It should be noted that each pair of the main body 1 and the fluid actuation system 2 has the same structure. In order to avoid redundant descriptions, the structures of one single main body 1 and one single fluid actuation system 2 are exemplified for descriptions in the following embodiments. In the embodiment, the fluid actuation system 2 is disposed within the main body 1 and includes a driving zone 21, a flow guiding channel 22, a convergence chamber 23, a plurality of valves 24 (e.g., valves 24a, 24b, 24c, and 24d) and a fluid discharging zone 25.

Figure 3A:
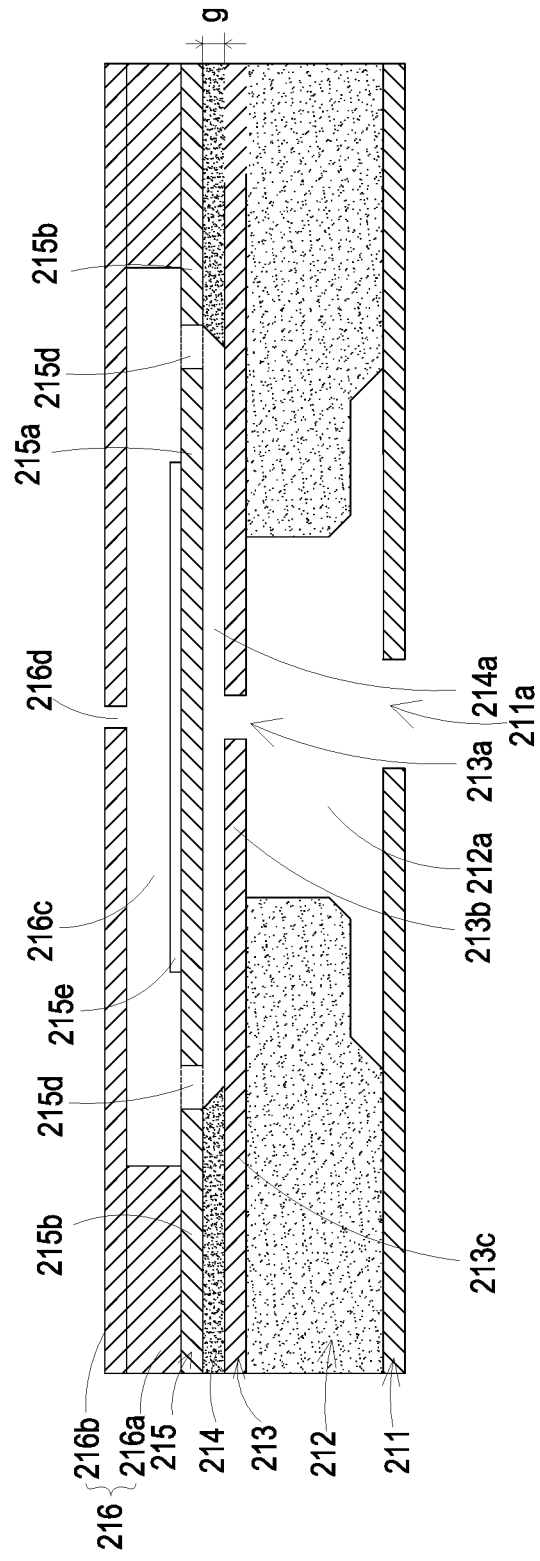
FIG. 3A is a schematic cross-sectional view illustrating a flow guiding unit of the fluid actuation system according to the embodiment of the present disclosure.
Figure 3B:
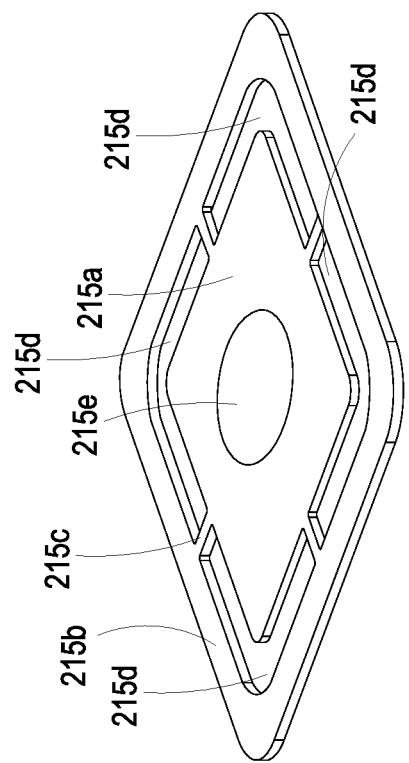
FIG. 3B is a perspective structural view illustrating an actuator of the flow guiding unit according to the embodiment of the present disclosure.
Figure 3C:
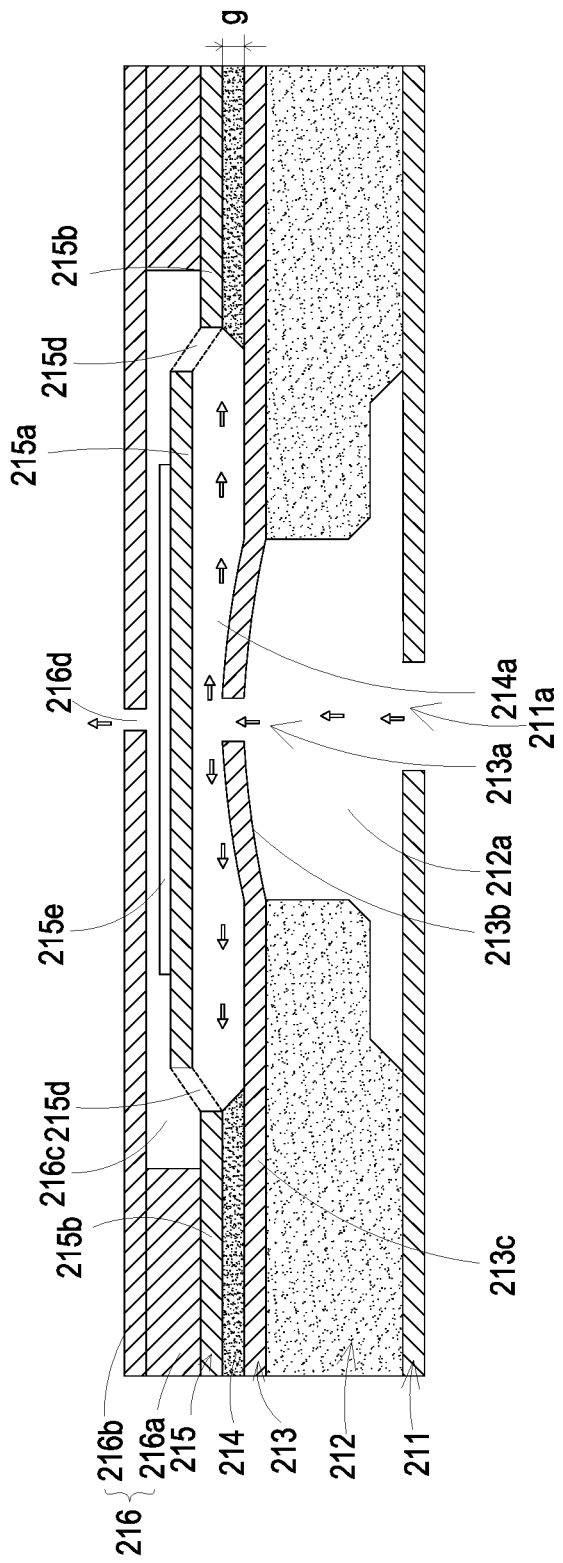
FIGS. 3C and 3D schematically illustrate the actions of the flow guiding unit of the fluid actuation system of FIG. 3A.
Figure 3D:
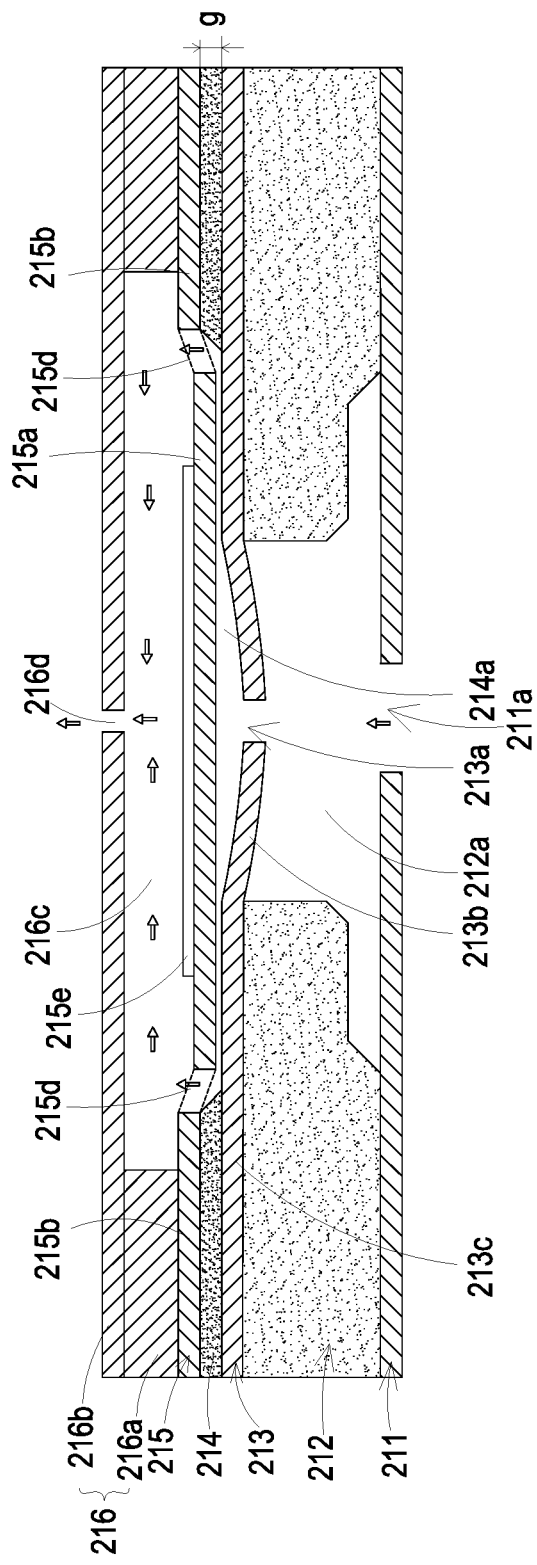
Figure 4A:
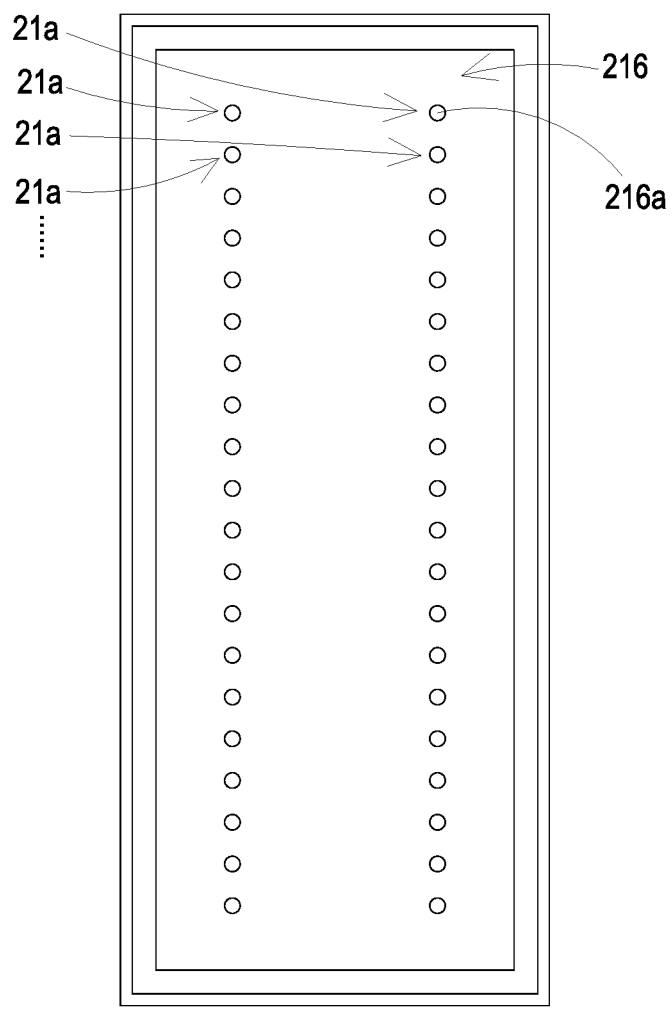
FIG. 4A schematically illustrates a portion of the driving zone of the fluid actuation system, in which the flow guiding units are disposed in a serial arrangement.

Please refer to FIGS. 2, 3A and 4A. In the embodiment, the driving zone 21 includes a plurality of flow guiding units 21a. Preferably but not exclusively, the plurality of flow guiding units 21a of the driving zone 21 are disposed in a serial arrangement, as shown in FIG. 4A. Preferably but not exclusively, the flow guiding unit 21a is a piezoelectric pump. In the embodiment, each flow guiding unit 21a includes an inlet plate 211, a base 212, a resonance plate 213, a spacer 214, an actuator 215 and an outlet plate 216, which are stacked on each other sequentially. The inlet plate 211 has at least one inlet aperture 211a. The base 212 is stacked on and connected with the inlet plate 211 and has a communication channel 212a in fluid communication with the inlet aperture 211a. The resonance plate 213 is stacked on and connected with the base 212 and includes a central aperture 213a, a movable part 213b and a fixing part 213c. Preferably but not exclusively, the central aperture 213a is formed in a center part of the resonance plate 213 and spatially corresponds to the communication channel 212a of the base 212. The movable part 213b is a flexible structure formed around the central aperture 213a and located at a part of the base 212, which is not contacted with the moveable part 213b. The fixing part 213c is fixed on a part of the base 212, which is contacted with the fixing part 213c. The spacer 214 is stacked on and connected with a part of the fixing part 213c of the resonance plate 213, and has a center hollowed to form a buffering chamber 214a. The actuator 215 is stacked on and connected to the spacer 214. In that, the spacer 214 is disposed between the resonance plate 213 and the actuator 215, and the depth of the buffering chamber 214a is defined by the thickness g of the spacer 214. Furthermore, as shown in FIG. 3B, the actuator 215 has a hollow suspension structure and includes a suspension part 215a, an outer frame part 215b, a plurality of connecting parts 215c, a plurality of vacant spaces 215d and a piezoelectric element 215e. The suspension part 215a is connected with the outer frame part 215b through the plurality of connecting parts 215c, so that the suspension part 215a is suspended and elastically supported by the outer frame part 215b, and is movable. The plurality of vacant spaces 215d are defined between the suspension part 215a and the outer frame part 215b for allowing the fluid to flow therethrough. The way of disposition, the types and the numbers of the suspension part 215a, the outer frame part 215b and the vacant spaces 215d may be varied according to the practical requirements, but not limited thereto. In the embodiment, the piezoelectric element 215e is attached on and connected to a surface of the suspension part 215a. The outlet plate 216 is formed by stacking and connecting a chamber plate 216a with a cover 216b. The chamber plate 216a is stacked on and connected to the actuator 215 and includes an outlet chamber 216c located at the center. The chamber plate 216a is covered on a partial region of the suspension part 215a, the outer frame part 215b, the plurality of connecting parts 215c, the plurality of vacant spaces 215d and the piezoelectric element 215e. The cover 216b has an outlet aperture 216d in fluid communication with the outlet chamber 216c. In the embodiment, the base 212 of the flow guiding unit 21a further includes a driving circuit (not shown) electrically connected to the positive electrode (not shown) and the negative electrode (not shown) of the piezoelectric element 215e so as to provide driving power to the piezoelectric element 215e, but not limited thereto. In other embodiment, the driving circuit may be disposed at any position within the flow guiding unit 21a. The disposed position of the driving circuit may be varied according to practical requirements.

Please refer to FIGS. 3A to 3D. When the piezoelectric element 215e is driven in response to an applied voltage, the piezoelectric element 215e undergoes bending deformation to drive the actuator 215 to vibrate along a vertical direction in a reciprocating manner. Please refer to FIG. 3C. When the piezoelectric element 215e undergoes the bending deformation and vibrates upwardly to move in a direction away from the base 212, the suspension part 215a of the actuator 215 is driven to move in the direction away from the base 212. The movable part 213b is driven along with the suspension part 215a and also moves in the direction away from the base 212. In that, the volume of the buffering chamber 214a of the spacer 214 is enlarged and the pressure in the buffering chamber 214a is reduced to generate a sucking force. The fluid is inhaled in the inlet plate 211 through the inlet aperture 211a, and is then converged into the communication channel 212a of the base 212. Then, the fluid flows into the buffering chamber 214a through the central aperture 213a of the resonance plate 213 for temporary storage. Please refer to FIG. 3D. When the piezoelectric element 215e undergoes the bending deformation and vibrates downwardly, the suspension part 215a of the actuator 215 is driven by the piezoelectric element 215e to move in a direction toward the base 212. The buffering chamber 214a is compressed by the suspension part 215a of the actuator 215 to reduce the volume thereof, and the fluid in the buffering chamber 214a is compressed toward the periphery and flows into the outlet chamber 216c through the plurality of vacant spaces 215d. Please refer to FIG. 3C, again. When the piezoelectric element 215e undergoes the bending deformation and vibrates upwardly to move in the direction away from the base 212, the suspension part 215a of the actuator 215 is driven to move in the direction away from the base 212. Consequently, the fluid temporarily stored in the outlet chamber 216c is discharged out of the outlet plate 216 through the outlet aperture 216d of the outlet plate 216 so as to accomplish a fluid transportation process. By performing the above actions and steps illustrated in FIGS. 3C and 3D repeatedly, the fluid is continuously inhaled into the inlet aperture 211a to be pressurized and discharged out through the outlet aperture 216d. In such way, the purpose of fluid transportation is achieved. In the embodiment, the vibration frequency of the resonance plate 213 along the vertical direction in the reciprocating manner may be identical to the vibration frequency of the actuator 215. That is, the resonance plate 213 and the actuator 215 synchronously vibrate along the upward direction or the downward direction. It should be noted that numerous modifications and alterations of the actions of the flow guiding unit 21a may be made while retaining the teachings of the disclosure. In this embodiment, the flow guiding unit 21a can generate a pressure gradient in the designed fluid channels of itself to facilitate the fluid to flow at a high speed. Since there is an impedance difference between the inlet direction and the outlet direction, the fluid can be transported from the inlet aperture 211a to the outlet aperture 216d of the flow guiding unit 21a. Moreover, even if a gas pressure exists at the discharge end of the outlet aperture 216d, the flow guiding unit 21a still has the capability to discharge out the fluid while achieving the silent efficacy.

Figure 4C:
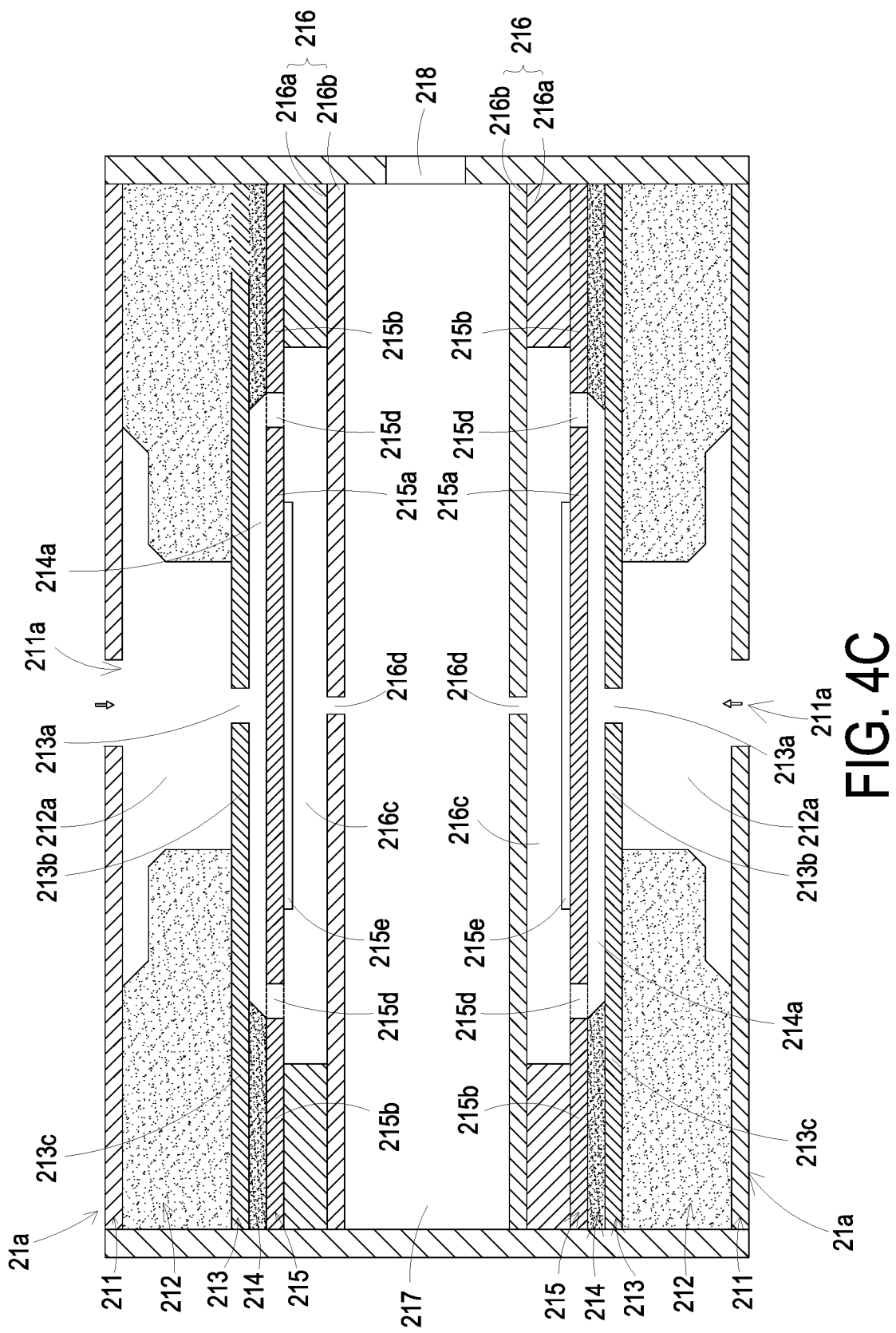
FIG. 4C schematically illustrates a portion of the driving zone of the fluid actuation system, in which the flow guiding units are connected with each other in a parallel arrangement.
Figure 4D:
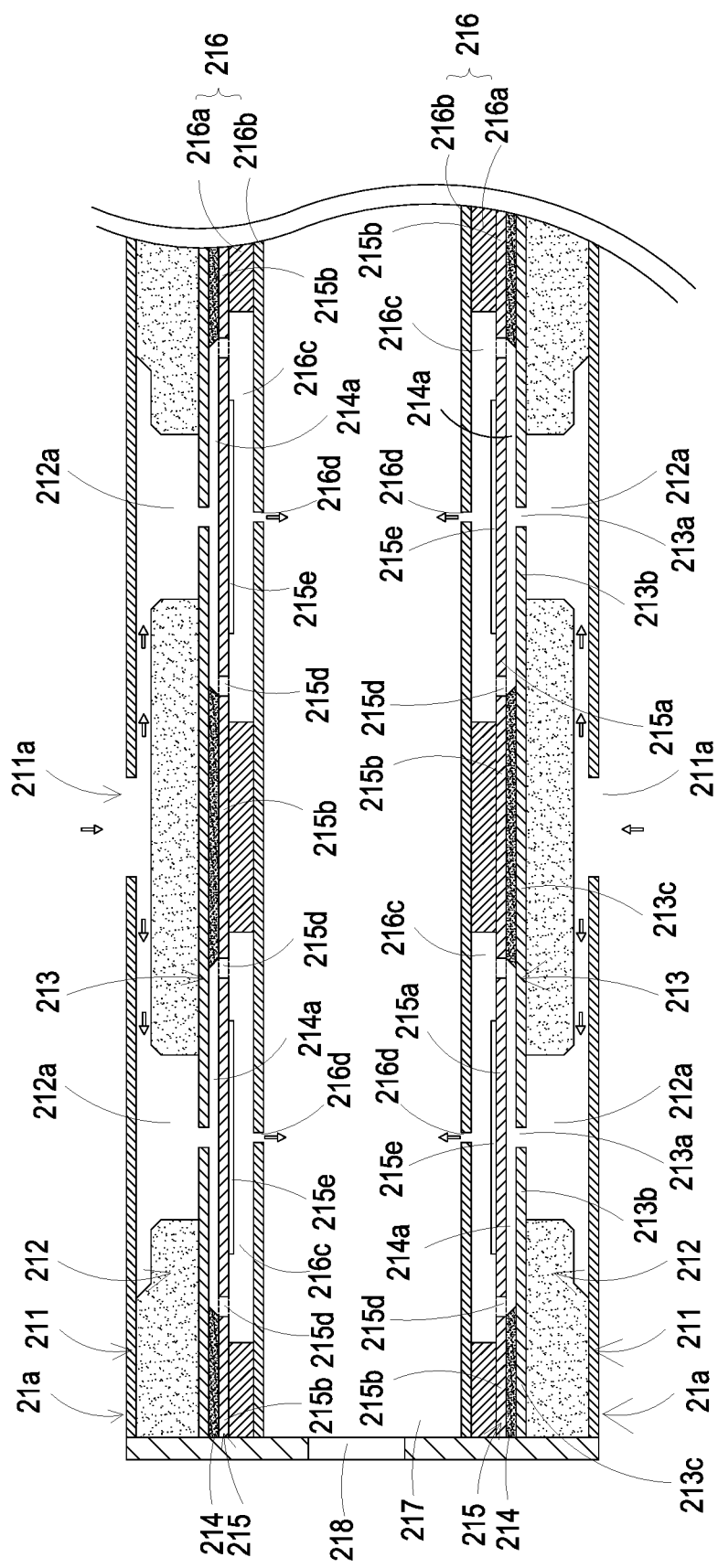
FIG. 4D schematically illustrates a portion of the driving zone of the fluid actuation system, in which the flow guiding units are connected with each other in a serial and parallel arrangement.
Figure 5:
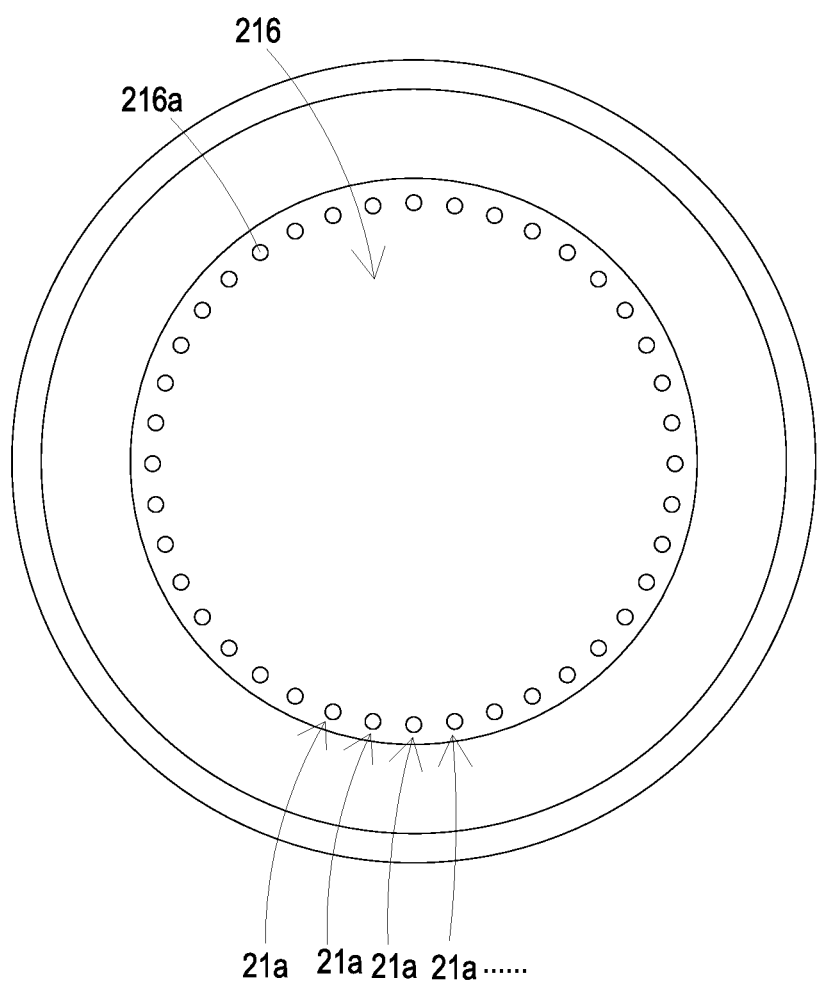
FIG. 5 schematically illustrates the driving zone of the fluid actuation system according to another embodiment of the present disclosure.
Figure 6:
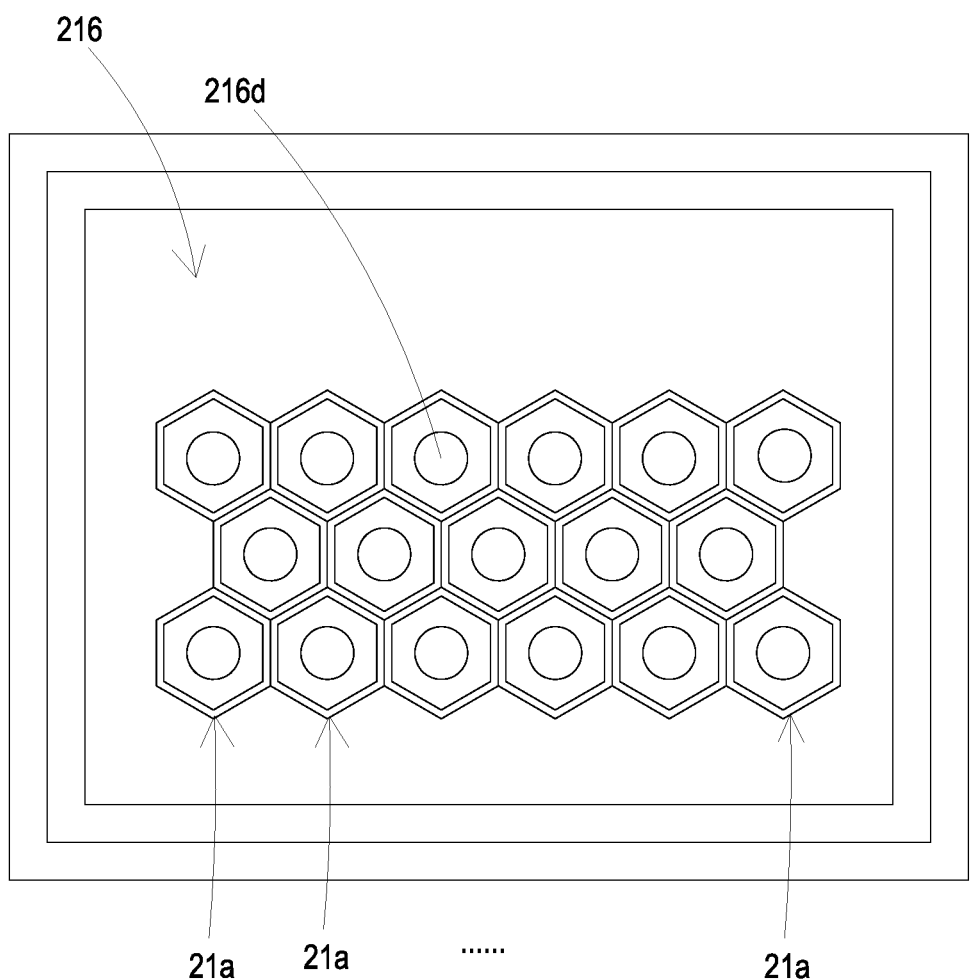
FIG. 6 schematically illustrates the driving zone of the fluid actuation system according to a further embodiment of the present disclosure.

Please refer to FIGS. 2 and 3A. In the embodiment, the driving zone 21 includes the plurality of flow guiding units 21a and the amount of the fluid to be discharged from the driving zone 21 is adjustable according to the arrangement of the flow guiding units 21a. As shown in FIGS. 4A and 4B, the plurality of flow guiding units 21a are disposed in a serial arrangement, so as to increase the amount of the fluid to be discharged through the outlet apertures 216d of the driving zone 21. In an embodiment, as shown in FIG. 4C, the plurality of flow guiding units 21a are disposed in a parallel arrangement, so as to increase the amount of the fluid to be discharged through the outlet apertures 216d of the driving zone 21. In that, the fluid is converged into an output channel 217, and then the amount of the fluid is converged to output through a convergence aperture 218. In an embodiment, as shown in FIG. 4D, the plurality of flow guiding units 21a are disposed in a serial arrangement, so as to increase the amount of the fluid to be discharged through the outlet apertures 216d of the driving zone 21. In that, the fluid is converged into an output channel 217, and then the amount of the fluid is converged and outputted through a convergence aperture 218. According to the embodiment shown in FIG. 5, the flow guiding units 21a of the driving zone 21 are disposed in a ring-shaped arrangement, so as to increase the amount of the fluid to be discharged from the driving zone 21. According to the embodiment shown in FIG. 6, the driving zone 21 of the fluid actuation system 2 includes the plurality of flow guiding units 21a, which are disposed in a honeycomb arrangement, so as to increase the amount of the fluid to be discharged from the driving zone 21. Moreover, in the embodiment, the flow guiding units 21a of the fluid actuation system 2 have high flexibility in assembling arrangement as long as being connected with the driving circuit, and the flow guiding units 21a may be enabled to transport the fluid simultaneously so as to transport a great amount of fluid according to the practical requirements. In addition, each flow guiding unit 21a may be individually controlled to be enabled or disabled. For example, one flow guiding unit 21a is enabled, and the other flow guiding unit 21a is disabled. Another example is that the flow guiding units 21a are alternately enabled, but not limited thereto. Consequently, the purpose of transporting various amount of the fluid and the purpose of reducing the power consumption is achieved.

Please refer to FIGS. 2, 3A and 4A. In the embodiment, the flow guiding channels 22 are in fluid communication with the outlet apertures 216d, (not shown in FIG. 2, as shown in FIGS. 3A and 4A) of the plurality of flow guiding units 21a of the driving zone 21, so as to receive the fluid to be discharged from the plurality of flow guiding units 21a. Moreover, the flow guiding channels 22 include a plurality of diverge channels, each of the diverge channels is further in fluid communication with a plurality of connection channels, and the fluid is converged to the fluid discharging zone 25 through the plurality of connection channels. In that, the fluid is outputted in the required amount. In the embodiment, the plurality of diverge channels are described only by a first diverge channel 22a and a second diverge channel 22b, and are not limited thereto. The plurality of connection channels are described only by a first connection channel set 22c and a second connection channel set 22d, and are not limited thereto. Moreover, the first connection channel set 22c includes a first connection channel 221c and a second connection channel 222c, and the second connection channel set 22d includes a third connection channel 221d and a fourth connection channel 222d. In the embodiment, the lengths and the widths of the plurality of diverge channels are preset according to the required amount the fluid to be transported. Namely, the variations of the lengths and the widths of the first diverge channel 22a and the second diverge channel 22b affect the flow rate and the amount of the fluid transported. The lengths and the widths of the first diverge channel 22a and the second diverge channel 22b are calculated and preset according to the required amount of the fluid. In the embodiment, the first diverge channel 22a and the second diverge channel 22b are in fluid communication with the flow guiding channel 22. The first diverge channel 22a and the second diverge channel 22b shown in the drawings are communicated with the flow guiding channel 22 in a parallel arrangement, but it is not limited thereto. In an embodiment, the first diverge channel 22a and the second diverge channel 22b are disposed in a serial arrangement. In other embodiments, the plurality of diverge channels are disposed in a serial and parallel arrangement. Moreover, in the embodiment, the first diverge channel 22a is further connected with the first connection channel set 22c. The first diverge channel 22a is in communication with the first connection channel 221c and the second connection channel 222c in a serial arrangement, but it is not limited thereto. In an embodiment, the first connection channel set 22c is arranged in a parallel arrangement. In other embodiment, the first connection channel set 22c is arranged in a serial and parallel arrangement. Similarly, the second diverge channel 22b is further connected with the second connection channel set 22d. The second diverge channel 22b is in communication with the third connection channel 221d and the fourth connection channel 222d in a serial arrangement, but it is not limited thereto. In an embodiment, the second connection channel set 22d is arranged in a parallel arrangement. In the other embodiment, the second connection channel set 22d is arranged in a serial and parallel arrangement. The present disclosure is not limited thereto and not redundantly described herein.

In the embodiment, the convergence chamber 23 is disposed and in fluid communication between the first diverge channel 22a and the second diverge channel 22b to allow the fluid to be accumulated therein. In that, when the fluid actuation system 2 is controlled and the fluid required is outputted through the diverge channels 22, a transporting amount of the fluid transported through the plurality of the diverge channels 22 is increased.

In the embodiment, the plurality of valves 24 are disposed between the corresponding connection channel and the fluid discharging zone 25, and are controlled in an open/closed state by the controller 3, so that the amount of the fluid outputted through the fluid discharging zone 25 is controlled. As shown in FIG. 2, in the embodiment, the plurality of valves 24 are described by the valves 24a, 24b, 24c and 24d, and not limited thereto. The plurality of valves 24a, 24b, 24c and 24d may be active valves or passive valves. In the embodiment, the plurality of valves 24a, 24b, 24c and 24d are the active valves, and disposed in the first connection channel 221c, the third connection channel 221d, the second connection channel 222c, and the fourth connection channel 222d, sequentially, to control the open/closed state thereof. For example, when the valve 24a is controlled in the open state, the first connection channel 221c allows the fluid to flow to the fluid discharging zone 25. When the valve 24b is controlled in the open state, the third connection channel 221d allows the fluid to flow to the fluid discharging zone 25. When the valve 24c is controlled in the open state, the second connection channel 222c allows the fluid to flow to the fluid discharging zone 25. When the valve 24d is controlled in the open state, the fourth connection channel 222d allows the fluid to flow to the fluid discharging zone 25. In the embodiment, the controller 3 includes two conductive wires 31 and 32. The conductive wire 31 is electrically connected with the control terminals of the valves 24a and 24d to control the open/closed state thereof, and the conductive wire 32 is electrically connected with the control terminals of the valves 24b and 24c to control the open/closed state thereof. Consequently, the open/closed states of the valves 24a, 24b, 24c and 24d can be controlled by the controller 3, so that the fluid communication states of the corresponding first connection channel 221c, the third connection channel 221d, the second connection channel 222c and the fourth connection channel 222d are controlled by the controller 3 for allowing the fluid to be selectively transported to the fluid discharging zone 25.

Figure 7A:
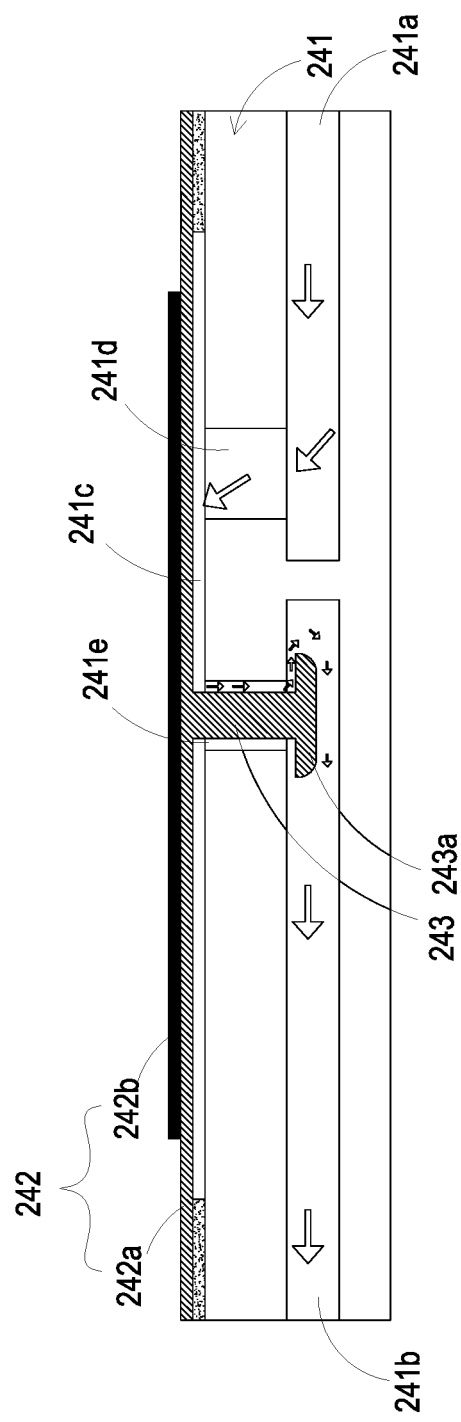
FIGS. 7A and 7B are schematic cross-sectional views illustrating the actions of the valve used in the fluid actuation system according to a first aspect of the embodiment of the present disclosure.
Figure 7B:
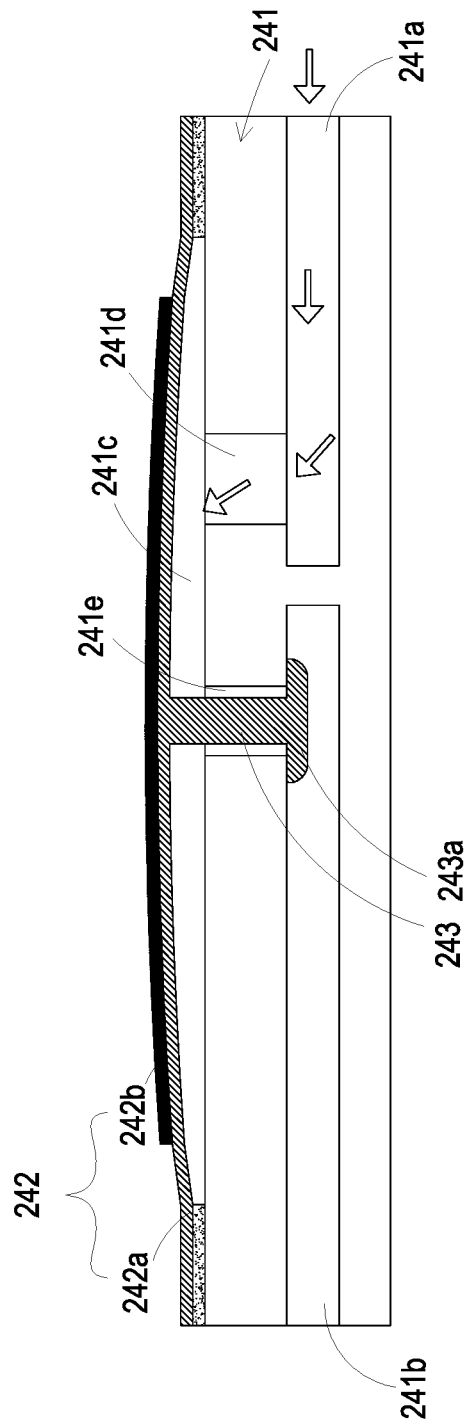

FIGS. 7A and 7B are schematic cross-sectional views illustrating the actions of the valve used in the fluid actuation system according to a first aspect of the present disclosure. According to the first aspect of the present disclosure, the valve 24 includes a channel base 241, a piezoelectric actuator 242 and a linking bar 243. The valve 24 is exemplified as being disposed in the first connection channel 221c (Referring to FIG. 2). The structures and actions of the valves 24 disposed in the second connection channel 221d, the third connection channel 222c and the fourth connection channel 222d are similar to the structure and the actions of the valve 24 disposed in the first connection channel 221c, and are not redundantly described herein. The channel base 241 includes a first passage 241a and a second passage 241b, which are in fluid communication with the first connection channel 221c and are separated from each other by a partial structure of the channel base 241. A cavity 241c is concavely formed on the top surface of the channel base 241. The cavity 241c has a first outlet 241d and a second outlet 241e. The first outlet 241d is in fluid communication with the first passage 241a, and the second outlet 241e is in fluid communication with the second passage 241b. The piezoelectric actuator 242 includes a carrier plate 242a and a piezoelectric ceramic plate 242b. The carrier plate 242a may be made of a flexible material. The carrier plate 242a is located over the cavity 241c to cover the cavity 241c, so that the cavity 241c is closed. The piezoelectric ceramic plate 242b is attached on a first surface of the carrier plate 242a and electrically connected to the controller 3 (Referring to FIG. 2). A first end of the linking bar 243 is connected with a second surface of the carrier plate 242a, and the linking bar 243 is inserted into the second outlet 241e and is movable within the second outlet 241e along a vertical direction. That is, the linking bar 243 may move along the direction perpendicular to the second passage 241b. A second end of the linking bar 243 is formed as a stopping part 243a to be used to close the second outlet 241e. The cross section area of the stopping part 243a has a diameter larger than the diameter of the second outlet 241e, by which the stopping part 243a is used to seal the second outlet 241e. The stopping part 243a may be a flat plate structure or a mushroom-shaped structure.

Please refer to FIG. 7A. When the piezoelectric actuator 242 of the valve 24 is not enabled, the linking bar 243 is in an initial position and in a normally open state. Meanwhile, a communication space is formed between the stopping part 243a and the second outlet 241e for allowing the second passage 241b, the cavity 241c and the first passage 241a to be in fluid communication with each other and in fluid communication with the first connection channel 221c (Referring to FIG. 2), so that the fluid is allowed to flow therethrough. On the contrary, referring to FIG. 7B, when the piezoelectric actuator 242 is enabled, the carrier plate 242a is driven to undergo upward bending deformation by the piezoelectric ceramic plate 242b, so that the linking bar 243 is driven to move upwardly by the carrier plate 242a. Consequently, the second outlet 241e is closed by being covered by the stopping part 243a, and the fluid cannot be transported through the second outlet 241e. In such way, the valve 24 makes the first connection channel 221c in the open state when the valve 24 is non-enabled, and the valve 24 makes the first connection channel 221c in the closed state when the valve 24 is enabled. In other words, the fluid is selectively transported through the first connection channel 221c, which is controlled by a fluid communication state of the second passage 241b of the valve 24.

Figure 8A:
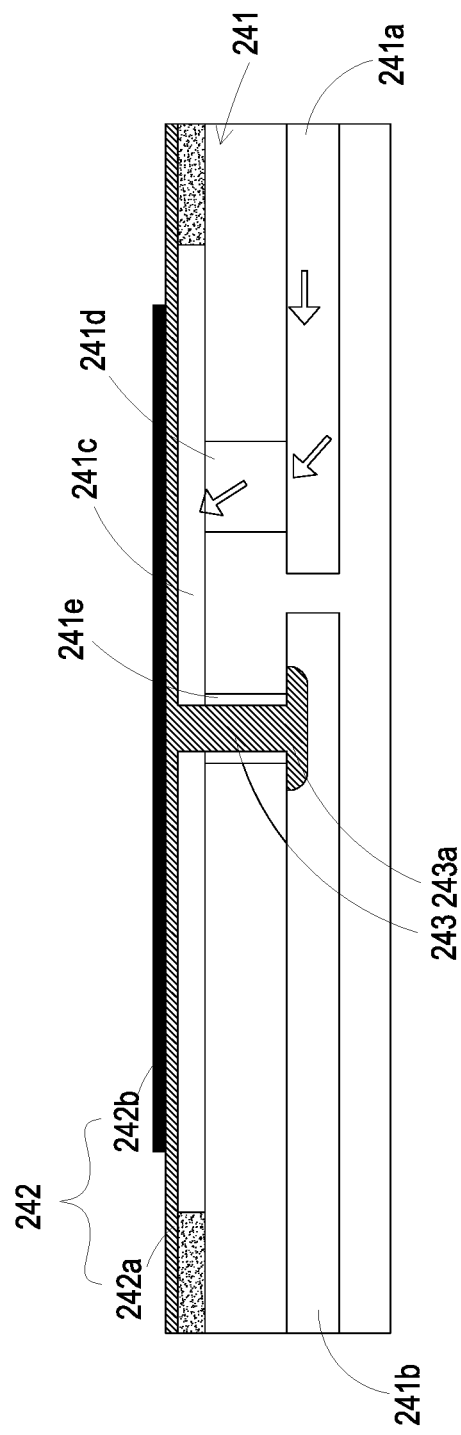
FIGS. 8A and 8B are schematic cross-sectional views illustrating the actions of the valve used in the fluid actuation system according to a second aspect of the embodiment of the present disclosure.
Figure 8B:
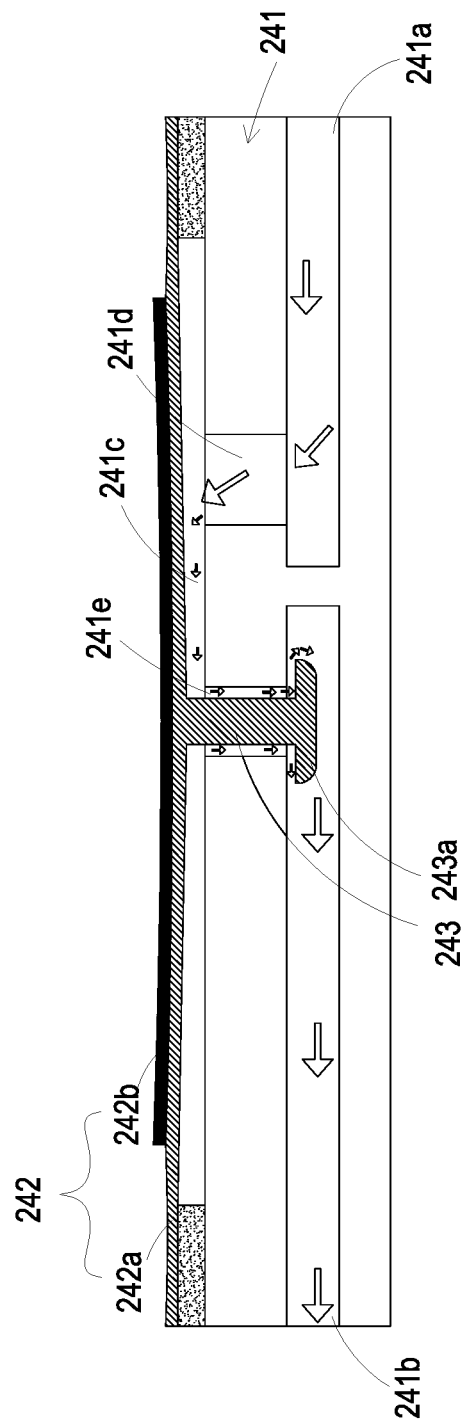

FIGS. 8A and 8B are schematic cross-sectional views illustrating the actions of the valve used in the fluid actuation system according to a second aspect of the present disclosure. According to the second aspect of the present disclosure, the structure of the valve 24 is similar to that of FIGS. 7A and 7B. In contrast, the valve 24 is in a normally closed state when the valve 24 is not enabled.

Please refer to FIG. 8A. When the piezoelectric actuator 242 of the valve 24 is not enabled, the linking bar 243 is in an initial position and in a normally closed state. Meanwhile, the second outlet 241e is closed by being sealed by the stopping part 243a, and the fluid cannot be transported through the second outlet 241e. Please refer to FIG. 8B. When the piezoelectric actuator 242 is enabled, the carrier plate 242a is driven to undergo downward bending deformation by the piezoelectric ceramic plate 242b, so that the linking bar 243 is driven to move downwardly by the carrier plate 242a. Under this circumstance, a communication space is formed between the stopping part 243a and the second outlet 214e for allowing the second passage 241b, the cavity 241c and the first passage 241a to be in fluid communication with each other and in fluid communication with the first connection channel 221c (Referring to FIG. 2), so that the fluid is allowed to flow therethrough. In such way, the valve 24 makes the first connection channel 221c in the closed state when the valve 24 is non-enabled, and the valve 24 makes the first connection channel 221c in the open state when the valve 24 is enabled. In other words, the fluid is selectively transported through the first connection channel 221c, which is controlled by a fluid communication state of the second passage 241b of the valve 50.

From the above descriptions, the driving zone 21 of the fluid actuation system 2 is formed by one or more flow guiding units 21a, and the flow guiding units 21a are arranged in a series, parallel or series-parallel arrangement. Each flow guiding unit 21a is enabled to generate a pressure gradient inside itself, so that the fluid is inhaled and pressurized to be discharged through the outlet aperture 216d. The fluid flows through a flow guiding channel 22, and is accumulated in a convergence chamber for storage. When the fluid actuation system 2 is controlled to output the fluid, the transporting amount of the fluid transported through the flow guiding channel 22 is increased. The transporting amount of the fluid outputted through the flow guiding channel 22 is controlled by a plurality of valves 24, and the fluid is converged in the fluid discharging zone 25 for outputting the transporting amount according to the requirement. It is achieved to convert the electric energy into the kinetic energy. The kinetic energy is utilized to generate a specific gas pressure and gas flow rate. When the main body 1 of the power driver is applied to and assembled in the unmanned aerial vehicle, a sufficient driving force is provided to the power driver of the unmanned aerial vehicle for flight.

In summary, the present disclosure provides a power driver of an unmanned aerial vehicle. A fluid actuation system is disposed within a main body of a power actuator. A driving zone of the fluid actuation system is formed by one or more flow guiding units arranged in a series, parallel or series-parallel arrangement. Each flow guiding unit is enabled to generate a pressure gradient inside itself, so that the fluid is inhaled, flows through a flow guiding channel, and is accumulated in a convergence chamber for storage. When the fluid required is outputted, the transporting amount can be increased. The transporting amount of the fluid outputted through the flow guiding channel is controlled by a plurality of valves, and the fluid is converged in a fluid discharging zone for outputting the transporting amount according to the requirement. It is achieved to convert the electric energy into the kinetic energy. Furthermore, the transporting amount, the flow rate and the pressure of the fluid outputted by the fluid actuation system are controlled and adjusted. Thus, the driving method of the flow guiding unit and the number and arrangement of the flow guiding channels are adjusted flexibly, and it is beneficial to meet the needs of controlling various transporting amount and achieve the gas transportation in high transporting amount, high efficiency and high flexibility. When the power driver is applied to the unmanned aerial vehicle, a sufficient driving force is provided for flight.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power driver of an unmanned aerial vehicle converting electric energy into kinetic energy, and utilizing the kinetic energy to generate a specific gas pressure and gas flow rate, wherein the power driver of the unmanned aerial vehicle comprises:
   at least one main body;
   at least one fluid actuation system disposed within the main body and comprising:
      a driving zone comprising a plurality of flow guiding units, wherein each flow guiding unit comprises an outlet aperture, and when each at least one flow guiding units is actuated, fluid is transported through each at least one flow guiding unit;
      a plurality of flow guiding channels comprising a plurality of diverge channels, wherein each of the plurality of diverge channels is in fluid communication with a plurality of connection channels to flow a required amount of the fluid, and the fluid is converged and transported through each of the plurality of connection channels;
      a convergence chamber in fluid communication between each of the plurality of diverge channels to allow the fluid to be accumulated therein, so that when the required amount of fluid is discharged from the fluid actuation system, a transporting amount of the fluid transported through the plurality of the diverge channels is increased;
      a plurality of valves, one of the plurality of valves each disposed in a corresponding one of the plurality of connection channels and controllable between open and closed states for the corresponding connection channel; and
      a fluid discharging zone connected with the plurality of connection channels to converge and discharge from the fluid actuation system the fluid in the required amount; and
   a controller connected to the plurality of valves to control each of the plurality of valves between open and closed states, so that the plurality of connection channels are controlled and the fluid transported through the plurality of connection channels are converged into the fluid discharging zone and outputted in the required amount for providing the power driver with a driving force to fly.

2. The power driver of the unmanned aerial vehicle according to claim 1, wherein the plurality of flow guiding units of the driving zone are disposed in a serial arrangement to transport the fluid.

3. The power driver of the unmanned aerial vehicle according to claim 1, wherein the plurality of flow guiding units of the driving zone are disposed in a parallel arrangement to transport the fluid.

4. The power driver of the unmanned aerial vehicle according to claim 1, wherein the plurality of flow guiding units of the driving zone are disposed in a serial and parallel arrangement to transport the fluid.

5. The power driver of the unmanned aerial vehicle according to claim 1, wherein the plurality of flow guiding units of the driving zone are disposed in a ring-shaped arrangement to transport the fluid.

6. The power driver of the unmanned aerial vehicle according to claim 1, wherein the plurality of flow guiding units of the driving zone are disposed in a honeycomb arrangement to transport the fluid.

7. The power driver of the unmanned aerial vehicle according to claim 1, wherein each at least one flow guiding unit comprises:
   an inlet plate comprising at least one inlet aperture;
   a base stacked on and connected with the inlet plate, and comprising a communication channel in fluid communication with the at least one inlet aperture;
   a resonance plate stacked on and connected with the base, and comprising a central aperture, a movable part and a fixing part, wherein the central aperture is formed in a center part of the resonance plate and spatially corresponds to the communication channel of the base, wherein the movable part is a flexible structure formed around the central aperture and located at a part of the base not contacted therewith, wherein the fixing part is fixed on a part of the base contacted therewith;
   a spacer stacked on and connected with the fixing part of the resonance plate and having a center hollowed to form a buffering chamber;
   an actuator stacked on and connected with the spacer, and comprising a suspension part, an outer frame part, a plurality of connecting parts, a plurality of vacant spaces and a piezoelectric element, wherein the suspension part is connected with the outer frame part through the plurality of connecting parts, so that the suspension part is suspended and elastically supported by the outer frame part, wherein the plurality of vacant spaces are defined between the suspension part and the outer frame part for allowing the fluid to flow therethrough, wherein the piezoelectric element is attached on a surface of the suspension part; and
   an output plate comprising a chamber plate and a cover, wherein the chamber plate is stacked on and connected with the cover and comprises an outlet chamber, wherein the cover is covered on the actuator and comprises an outlet aperture in fluid communication with the outlet chamber;
   wherein when the piezoelectric element of the actuator is driven and the suspension part vibrates between the outlet chamber and buffering chamber in a reciprocating manner, a pressure gradient is generated in the outlet chamber and the buffering chamber, and the fluid is inhaled through the inlet aperture of the inlet plate into the plurality of connection channels, flows through the central aperture of the resonance plate to the buffering chamber to be compressed, is transported into the outlet chamber through the plurality of vacant spaces of the actuator, and is discharged out through the outlet aperture of the outlet plate.

8. The power driver of the unmanned aerial vehicle according to claim 7, wherein the depth of the buffering chamber in the flow guiding unit is defined by the thickness of the spacer.

9. The power driver of the unmanned aerial vehicle according to claim 1, wherein the lengths of the plurality of diverge channels are preset according to the required amount of the fluid to be transported.

10. The power driver of the unmanned aerial vehicle according to claim 1, wherein the widths of the plurality of diverge channels are preset according to the required amount of the fluid to be transported.

11. The power driver of the unmanned aerial vehicle according to claim 1, wherein each of the plurality of valves comprises:
   a channel base comprising a first passage and a second passage separated from each other and in fluid communication with each corresponding one of the plurality of connection channels, wherein a cavity is concavely formed in the channel base and has a first outlet and a second outlet in fluid communication with each other, wherein the first outlet is in fluid communication with the first passage, and the second outlet is in fluid communication with the second passage;
   a piezoelectric actuator comprising a carrier plate and a piezoelectric ceramic plate, wherein the carrier plate covers the cavity, and the piezoelectric ceramic plate is attached on a first surface of the carrier plate and electrically connected to the controller; and
   a linking bar comprising a first end and a second end, wherein the first end of the linking bar is connected with a second surface of the carrier plate, and the linking bar is inserted into the second outlet and is movable within the second outlet along a vertical direction, wherein the second end of the linking bar is formed as a stopping part to close the second outlet, and the cross section area of the stopping part has a diameter larger than the diameter of the second outlet;
   wherein when the piezoelectric actuator is enabled to drive the carrier plate to displace, the stopping part of the linking bar is driven to move to control an open and closed state of the second outlet, so that the fluid transported through the corresponding connection channel is controlled.

* * * * *